2,992,203
HIGH IMPACT RESISTANT POLYMERS DERIVED PRIMARILY FROM ESTERS OF ACRYLIC AND METHACRYLIC ACIDS

Thomas F. Protzman, Levittown, Pa., assignor to Rohm & Haas Company, Philadelphia, Pa., a corporation of Delaware
No Drawing. Filed Mar. 25, 1957, Ser. No. 647,985
5 Claims. (Cl. 260—45.5)

The present invention relates to hard, rigid, tough, weather-resistant, dimensionally stable polymeric products formed primarily from esters of acrylic and methacrylic acids. More particularly, it relates to polymeric products of the type above referred to whose physical properties are surprisingly different from the physical properties of those polymerized esters of acrylic and methacrylic acids or copolymers of a methacrylic ester with acrylic or other methacrylic esters heretofore known. The physical properties of the polymeric products of this invention also markedly differ from those of products heretofore produced by dissolving acrylic or methacrylic polymers in acrylic or methacrylic monomers and subjecting the solution so formed to polymerizing conditions.

The polymeric products of this invention have a combination of properties not found in acrylic and/or methacrylic polymer and/or copolymer products heretofore available. Of particular importance in this regard is the high impact strength shown by these new products. This property makes possible fabrication and/or manufacture of impact resistant articles of increased durability. When tested by A.S.T.M. method D-256-47T the products of this invention have Izod milled notch impact strengths in foot-pounds per inch of notch of 1. or more. This is in marked contrast to polymeric acrylic and/or methacrylic esters of the types heretofore known which, by the same test, have Izod milled notch impact strengths in the same units of the order of .5 or less.

It has heretofore been assumed that polymeric products formed by dissolving a polymeric methacrylic ester in a monomeric acrylic ester and thereafter subjecting the mixture to polymerizing conditions would have properties similar to or identical with those of polymeric products formed by copolymerizing a mixture of the same monomeric methacrylic ester and monomeric acrylic ester. In fact this assumption is true when ratios of polymer dissolved in monomer suggested by the prior art are employed.

It has now been discovered that polymeric products of new and markedly different useful properties are obtained when 25 to 45 parts of a preformed, hard, rigid polymeric or copolymeric methacrylic ester is dissolved in 75 to 55 parts of a monomeric alkyl acrylic ester whose alkyl group contains from 2 to 8 carbon atoms, and the resulting solution is subjected to polymerizing conditions.

The hard, rigid polymeric methacrylic ester used in accordance with this invention may be a homopolymer or a copolymer of methacrylic ester in preponderance with a minor amount, i.e., less than 25% by weight, of other methacrylic esters or acrylic esters provided such homopolymer or copolymer is thermoplastic, is soluble in the monomer, and has a heat distortion temperature above 65° C. when measured by A.S.T.M. method D-648-45T. Typical methacrylic esters which may be used as the polymeric component are polymerized methyl methacrylate, trichloroethyl methacrylate, cyclohexyl methacrylate, isobornyl methacrylate, isobutyl methacrylate, and copolymers thereof with minor amounts of other acrylic or methacrylic esters. It has also been found that polymerized methyl α-chloroacrylate can be used in lieu of the aforesaid methacrylates.

In accordance herewith, the monomer in which the preformed polymer is dissolved may be a single acrylic ester or an acrylic ester admixed with other acrylic or methacrylic esters, provided the monomer or monomeric mixture, when polymerized per se, forms a polymer or copolymer having a bend brittle temperature below 0° C. and preferably below —10° C. when measured by A.S.T.M. method D-746-55T.

Monomeric starting materials that may be used are, by way of illustration, alkyl acrylic esters in which the alkyl group contains 2 to 8 carbon atoms and mixtures thereof with minor amounts of other monomers. Alkyl acrylic esters in which the alkyl group contains 2 to 4 carbon atoms, as well as mixtures of such esters with minor amounts, i.e., less than 25% of methyl methacrylate, ethyl methacrylate, benzyl methacrylate, butyl methacrylate, neopentyl diacrylate, trichloroethyl acrylate, benzyl acrylate, phenyl acrylate, and similar monomeric acrylates and methacrylates are preferred, it being understood that the limiting factor respecting the monomer or monomeric mixture is that when polymerized per se a polymer or copolymer having a bend-brittle temperature below 0° C. and preferably below —10° C. is produced. It has also been found that acrylic esters having alkoxy groups containing 1 to 7 carbon atoms and having a bend-brittle temperature as aforesaid, when polymerized per se, may be employed as the monomeric starting material.

To further illustrate this invention reference is made to the table below in which a comparison is made of the bend-brittle temperature of certain of the polymeric products herein claimed with the bend-brittle temperature of copolymers formed by utilizing, in the same ratios, methyl methacrylate and ethyl acrylate.

TABLE

| Composition of Initial Mixture | | | Bend-Brittle Temperature of Final Product, ° C. |
|---|---|---|---|
| Polymethyl Methacrylate | Monomeric Methyl Methacrylate | Monomeric Ethyl Acrylate | |
| 1 | -------- | 99 | —24 |
| -------- | 1 | 99 | —24 |
| 5 | -------- | 95 | —22 |
| -------- | 5 | 95 | —18 |
| 10 | -------- | 90 | —22 |
| -------- | 10 | 90 | —18 |
| 15 | -------- | 85 | —18 |
| -------- | 15 | 85 | —15 |
| 20 | -------- | 80 | —20 |
| -------- | 20 | 80 | —14 |
| 25 | -------- | 75 | +95 |
| -------- | 25 | 75 | —10 |
| 30 | -------- | 70 | +101 |
| -------- | 30 | 70 | —8 |
| 35 | -------- | 65 | +100 |
| -------- | 35 | 65 | 0 |
| 40 | -------- | 60 | +100 |
| -------- | 40 | 60 | +3 |

As will be seen from the table, polymeric products containing 25 or more parts of preformed polymer are hard and rigid as is evidenced by their A.S.T.M. bend-brittle temperatures of +95 to +101° C. These products are peculiarly tough and useful in that they have Izod notch impact strengths of one or greater when the acrylic monomer is one such as ethyl acrylate which, when polymerized per se, has a bend-brittle temperature below 0° C.

By way of contrast, the table shows that products formed by copolymerizing the monomers in the same ratio are soft and rubbery with bend-brittle temperatures below room temperature and even below 0° C.

In preparing the products of this invention the preformed polymer is dissolved in monomer by any convenient method, solution taking place more rapidly if the polymer is finely divided either as a result of grinding or being polymerized in bead or pearl form. Solution of the preformed polymer in the monomer may be accelerated by raising the temperature of the monomer-polymer mixture to from 50° C. to 70° C., exercising care that polymerization of the monomeric component does not occur at this point.

Both the speed with which the preformed polymer will dissolve in the monomer and the viscosity of the resulting solution will be affected by the molecular weight of the preformed polymer. The speed with which solution takes place is slower and the viscosity of the resulting solution higher if the molecular weight of the preformed polymer is high. In the latter instance, solution may be brought about by recognized slurrying procedure.

The products of this invention are formed by polymerizing the the solutions previously referred to within a relatively wide range of conditions. Temperatures from 25° C. to 100° C. may be employed, with a preference for temperatures of 50° C. to 70° C. Polymerization may be initiated with well-known free radical generating catalysts, such as acetyl peroxide, benzoyl peroxide, tertiary butyl hydroperoxide, azobis(isobutyronitrile) and the like. The usual precautions exercised in polymerizing acrylic and methacrylic monomers are followed. Polymerization is carried out in molds, such as glass cells or between cellophane sheets.

In accordance with this invention the preformed polymer may be of high molecular weight, e.g., 2,000,000, without affecting the desired properties of the final polymeric product. Preferably there is used a preformed polymer whose molecular weight is in the range of 10,000 to 300,000.

The following examples, given by way of illustration, will assist in a better understanding of this invention. The general comments given next below apply to all of the examples:

(1) While the monomer-polymer solution is a water clear liquid the resulting polymeric product, unless specifically noted, is a white translucent or white opaque solid.

(2) The Izod notch impact tests were conducted according to A.S.T.M. method D–256–47T. The thickness of the impact specimens was approximately ¼".

(3) The brittleness temperature tests were conducted according to A.S.T.M. method D–746–55T. The test specimens were cut from bulk cast sheets approximately 1/16" thick. A motor driven test machine was employed.

(4) The heat distortion temperatures were determined by A.S.T.M. method D–648–45T. Heat was applied at a rate of 2° C. increase per minute in oil under a load of 66 p.s.i.

(5) All sheets were cast in cellulose tubing unless otherwise specified.

(6) Molecular weights of the preformed polymers were weight averages determined by well-known intrinsic viscosity and light scattering measurement methods.

(7) Parts given in the examples are by weight.

*Example 1*

Twenty-five parts of preformed polymethyl methacrylate molding powder was dissolved at room temperature in 75 parts of monomeric ethyl acrylate. The heat distortion temperature of the polymethyl methacrylate was 100° C. and its molecular weight was of the order of 120,000. A sample of the ethyl acrylate, when polymerized per se, had a bend-brittle temperature of —23° C. 0.0125 parts of acetyl peroxide was added to the solution to serve as a catalyst and polymerization was effected at 50° C. for 24 hours between sheets of cellophane to produce a ¼" thick sheet. Thereafter the sheet was heated for one hour at 110° C. and for 20 minutes at 140° C. The Izod notch impact strength of such sheet was found to be 5.7 foot-pounds per inch of notch; its A.S.T.M. heat distortion temperature was 84° C., and its bend-brittle temperature was 95° C.

By way of contrast when only 20 parts of the same preformed polymer was dissolved in 80 parts of ethyl acrylate and catalyzed, polymerized, and otherwise similarly processed as above indicated, the resulting polymeric sheet was soft and rubbery with a measured bend-brittle temperature of —20° C. Thus it did not meet the requirements of a material suitable for testing to determine its Izod notch impact characteristics.

*Example 2*

Twenty-five parts of a preformed copolymer consisting of 85 parts of methyl methacrylate and 15 parts of ethyl acrylate, and possessing an A.S.T.M. heat distortion temperature of 80° C. and a molecular weight of the order of 130,000, was dissolved at 70° C. in 75 parts of n-butyl acrylate. The n-butyl acrylate, when polymerized per se, had a bend-brittle temperature of —55° C. 0.0125 parts of acetyl peroxide was added to the solution to serve as a catalyst and polymerization was effected for 12 hours at 50° C. Polymerization was continued for one hour at 110° C. and the sheet was thereafter annealed for 20 minutes at 140° C. The Izod notch impact strength of such sheet was 1.8 foot-pounds per inch of notch; its heat distortion temperature was 59° C., and its bend-brittle temperature was 81° C.

By way of contrast, when a sheet was formed by following the same procedure employing only 20 parts of the preformed polymer and 80 parts of n-butyl acrylate, the resulting sheet was soft and rubbery as indicated by its measured bend-brittle temperature of —40° C.

*Example 3*

Forty parts of the same preformed polymer as used in Example 2 was dissolved at 70° C. in 60 parts of n-butyl acrylate. The latter, when polymerized per se, had a bend-brittle temperature of —55° C. 0.0125 part of acetyl peroxide was added to the solution to serve as a catalyst and polymerization was effected between cellophane sheets for 12 hours at 50° C. Polymerization was continued for one hour at 110° C. and the sheet was then annealed for 20 minutes at 140° C. The Izod notch impact strength of such sheet was found to be 1.3 foot-pounds per inch of notch, and its heat distortion temperature was 63° C.

By way of contrast, when Example 3 was followed using n-butyl methacrylate, which when polymerized per se has a bend-brittle temperature of +20° C., instead of n-butyl acrylate, the resulting sheet had an Izod notch impact strength of only 0.22 foot-pound per inch of notch.

By way of further contrast, when 50 parts of the preformed polymer and 50 parts of the n-butyl acrylate were used, following the procedure of Example 3, there resulted a sheet whose Izod notch impact strength was 0.7 foot-pound per inch of notch.

*Example 4*

Thirty parts of preformed polymethyl methacrylate, having an A.S.T.M. heat distortion temperature of 100° C., was dissolved in 50 parts of ethyl acrylate and 20 parts of methylmethacrylate. The monomer mixture, when copolymerized per se, had a bend-brittle temperature of —2° C. 0.025% acetyl peroxide was added to the solution to serve as a catalyst and polymerization was effected between cellophane surfaces at 50° C. for 16 hours followed by one hour at 110° C. The sheet was annealed for 20 minutes at 140° C. The Izod impact strength of such a sheet was found to be 15.1 foot-pounds per inch of notch, and the heat distortion temperature was 83° C.

By way of contrast a sheet was formed exactly as last above set forth, except that a mixture of 40 parts of ethyl acrylate and 30 parts of methyl methacrylate was used. The monomeric mixture, when polymerized per se, had a bend-brittle temperature of +3° C. The resulting sheet possessed an Izod notch impact strength of only 0.25 foot-pound per inch of notch.

Example 5

Forty parts of preformed polymethyl methacrylate was dissolved in 50 parts of ethyl acrylate and 10 parts of ethyl methacrylate. This monomeric mixture had, when polymerized per se, a bend-brittle temperature of −10° C. 0.025 part of acetyl peroxide was added to the solution to serve as a catalyst and polymerization was effected between cellophane for 16 hours at 50° C., followed by one hour at 110° C. The resulting sheet was annealed for 20 minutes at 140° C. The Izod impact strength of such a sheet was 1.7 foot-pounds per inch of notch, and the heat distortion temperature was 92° C.

By way of contrast, a sheet formed exactly as last above set forth except that the preformed polymer was dissolved in a mixture of 30 parts of ethyl acrylate and 30 parts of ethyl methacrylate had an Izod impact strength of 0.4 foot-pound per inch of notch. The above mixture of ethyl acrylate and methacrylate polymerized by itself gave a polymer having a bend-brittle temperature of +2° C.

Example 6

Forty parts of preformed polymethyl methacrylate was dissolved in 55 parts of ethyl acrylate and 5 parts of methacrylic acid. The monomeric mixture, when polymerized per se, had a bend-brittle temperature of −10° C. 0.13 part of acetyl peroxide was added to the solution to serve as a catalyst and polymerization was effected at 50° C. between cellophane for one hour, followed by one hour at 110° C. The sheet was annealed for 20 minutes at 140° C. The resulting sheet possessed an Izod notch impact strength of 2.0 foot-pounds per inch of notch, and a heat distortion temperature of 90° C.

By way of contrast, when a sheet was formed exactly as above, employing however 60 parts of methyl methacrylate monomer to dissolve the preformed polymer, such sheet possessed an Izod notch impact strength identical with that of polymethyl methacrylate, namely 0.3 foot-pound per inch of notch. The sheet was transparent, clear, and appeared identical with homopolymerized polymethyl methacrylate.

Example 7

Forty parts of a preformed copolymer of 75 parts of trichloroethyl methacrylate and 25 parts of methyl methacrylate possessing an A.S.T.M. heat distortion temperature of 90° C. was dissolved in 60 parts of ethyl acrylate. 0.25 part of acetyl peroxide was added to the solution to serve as a catalyst and polymerization was effected in bulk between cellophane for 16 hours followed by one hour at 110° C., and thereafter annealed for 20 minutes at 140° C. The resulting sheet possessed an Izod notch impact strength of 3.5 foot-pounds per inch of notch, and an A.S.T.M. heat distortion temperature of 88° C.

By way of contrast, when in the above example 40 parts of preformed polyethyl acrylate, which is soft and rubbery, was employed instead of the above-mentioned preformed copolymer, to form a sheet following exactly the procedure described above, such sheet was found to be clear, transparent, and rubbery. In appearance, it was identical with homopolymerized ethyl acrylate.

Example 8

Forty parts of a preformed copolymer of 85 parts of methyl methacrylate and 15 parts of ethyl acrylate, which possessed a heat distortion temperature of 80° C., was dissolved in a mixture of 36 parts of 2-methoxyethyl acrylate and 24 parts of trichloroethyl acrylate. The monomeric mixture, when polymerized per se, had a bend-brittle temperature of −12° C. 0.013 part of acetyl peroxide was added to the solution to serve as a catalyst and polymerization was effected at 50° C. for 68 hours, followed by one hour at 120° C. The sheet thus formed has an Izod notch impact strength of 1.0 foot-pound per inch of notch, and a heat distortion temperature of 80° C.

Example 9

Thirty parts of a copolymer of 85 parts of methyl methacrylate and 15 parts of ethyl acrylate possessing a heat distortion temperature of 80° C. was dissolved in 70 parts of n-butyl acrylate and 0.8 part of neopentyl diacrylate monomer. The latter, when polymerized per se, had a bend-brittle temperature of −60° C. To the solution was added 0.05 part of azo bis(isobutyronitrile) as a catalyst and the solution was polymerized between cellophane at 50° C. for 16 hours, followed by one hour at 110° C. The resulting sheet was annealed 15 minutes at 130° C. The sheet thus formed possessed an Izod notch impact strength of 2.0 foot-pounds per inch of notch, and an A.S.T.M. heat distortion temperature of 60° C.

Example 10

Forty parts of polymerized methyl methacrylate, with a heat distortion temperature of 100° C., was dissolved in 45.6 parts of ethyl acrylate plus 14.4 parts of benzyl acrylate. The bend-brittle temperature of the monomeric mixture, when polymerized per se, was −5° C. 0.025 part of acetyl peroxide was added to the solution to serve as a catalyst and polymerization was effected in a glass mold at 50° C. for 72 hours, followed by one hour at 110° C. The sheet, upon being removed from the mold, was annealed for 30 minutes at 140° C. This sheet was clear and transparent with a light transmission of 74%, and had an Izod notch impact strength of 1.1 foot-pounds per inch of notch. Its heat distortion temperature was 97° C.

Example 11

Thirty parts of a copolymer of 85 parts of methyl methacrylate and 15 parts of ethyl acrylate, the copolymer having a heat distortion temperature of 80° C., was dissolved in 60 parts of n-butyl acrylate plus 10 parts of methyl methacrylate. The monomeric mixture, when polymerized per se, had a bend-brittle temperature of −40° C. .005 part of acetyl peroxide was added to the solution to serve as a catalyst and polymerization was effected between glass sheets for 16 hours at 70° C., and thereafter for one hour at 110° C. The polymeric product was separated from the glass sheets and annealed for 20 minutes at 140° C. This product had an Izod notch impact strength of 2.7 foot-pounds per inch of notch, and a heat distortion temperature of 60° C.

The above procedure was followed using .05 part of acetyl peroxide and polymerizing at 30° C. for 168 hours. The resulting product had properties practically identical with the product last above described.

The new products above described lend themselves well to customary modification with pigments, dyes, fillers, fibers, stabilizers, and the like.

I claim:

1. A hard, rigid, tough, weather-resistant dimensionally stable polymeric product having an Izod notch impact strength of at least 1 comprising 75 to 55 parts by weight of a member selected from the group consisting of monomeric alkyl acrylates having two to eight carbon atoms in the alkyl group and mixtures of at least 75% by weight of such an acrylate with another monomeric compound from the group consisting of acrylic and methacrylic esters copolymerizable therewith, said member, when polymerized by itself, having a bend-brittle temperature below 0° C., bulk polymerized while having dissolved therein 25 to 45 parts by weight of a preformed polymer of a monomer selected from the group consisting of methyl methacrylate, trichloroethyl methacrylate, cyclohexyl methacrylate, isobornyl methacrylate, isobutyl methacrylate, methyl-α-chloroacrylate and mixtures of at least 75% by weight of any one of said monomers with another compound from the group consisting of acrylic and methacrylic esters copolymerizable therewith, said preformed polymer having a heat distortion temperature above 65° C.

2. A hard, rigid, tough, weather-resistant, dimensionally stable polymeric product having an Izod notch impact strength of at least 1, comprising 75 to 55 parts by weight of ethyl acrylate bulk polymerized while having dissolved therein 25 to 45 parts by weight of a preformed polymer of a monomer selected from the group consisting of methyl methacrylate, trichloroethyl methacrylate, cyclohexyl methacrylate, isobornyl methacrylate, isobutyl methacrylate, methyl-α-chloroacrylate and mixtures of at least 75% by weight of any one of said monomers with another compound from the group consisting of acrylic and methacrylic esters copolymerizable therewith, said preformed polymer having a heat distortion temperature above 65° C.

3. A hard, rigid, tough, weather-resistant, dimensionally stable polymeric product having an Izod notch impact strength of at least 1, comprising 75 to 55 parts by weight of n-butyl acrylate bulk polymerized while having dissolved therein 25 to 45 parts by weight of a preformed polymer of a monomer selected from the group consisting of methyl methacrylate, trichloroethyl methacrylate, cyclohexyl methacrylate, isobornyl methacrylate, isobutyl methacrylate, methyl-α-chloroacrylate and mixtures of at least 75% by weight of any one of said monomers with another compound from the group consisting of acrylic and methacrylic esters copolymerizable therewith, said preformed polymer having a heat distortion temperature above 65° C.

4. A hard, rigid, tough, weather-resistant, dimensionally stable polymeric product having an Izod notch impact strength of at least 1, comprising 75 to 55 parts by weight of a mixture containing ethyl acrylate to an extent of at least 75% by weight, the remaining portion of the mixture being benzyl acrylate bulk polymerized while having dissolved therein 25 to 45 parts by weight of a preformed polymer of a monomer selected from the group consisting of methyl methacrylate, trichloroethyl methacrylate, cyclohexyl methacrylate, isobornyl methacrylate, isobutyl methacrylate, methyl-α-chloroacrylate and mixtures of at least 75% by weight of any one of said monomers with another compound from the group consisting of acrylic and methacrylic esters copolymerizable therewith, said preformed polymer having a heat distortion temperature above 65° C.

5. A hard, rigid, tough, weather-resistant, dimensionally stable polymeric product having an Izod notch impact strength of at least 1, comprising 75 to 55 parts by weight of a mixture containing ethyl acrylate to an extent of at least 75% by weight, the remaining portion of the mixture being benzyl methacrylate bulk polymerized while having dissolved therein 25 to 45 parts by weight of a preformed polymer of a monomer selected from the group consisting of methyl methacrylate, trichloroethyl methacrylate, cyclohexyl methacrylate, isobornyl methacrylate, isobutyl methacrylate, methyl-α-chloroacrylate and mixtures of at least 75% by weight of any one of said monomers with another compound from the group consisting of acrylic and methacrylic esters copolymerizable therewith, said preformed polymer having a heat distortion temperature above 65° C.

References Cited in the file of this patent

UNITED STATES PATENTS

| | | |
|---|---|---|
| 2,666,042 | Nozaki | Jan. 12, 1954 |
| 2,848,750 | Sannecke et al. | Aug. 26, 1958 |

FOREIGN PATENTS

| | | |
|---|---|---|
| 679,562 | Great Britain | Sept. 17, 1952 |
| 958,214 | France | Sept. 12, 1949 |